INVENTORS
ALFRED J. MILLER
LLOYD W. YOUNG
BY Barnwell P. King
ATTORNEY

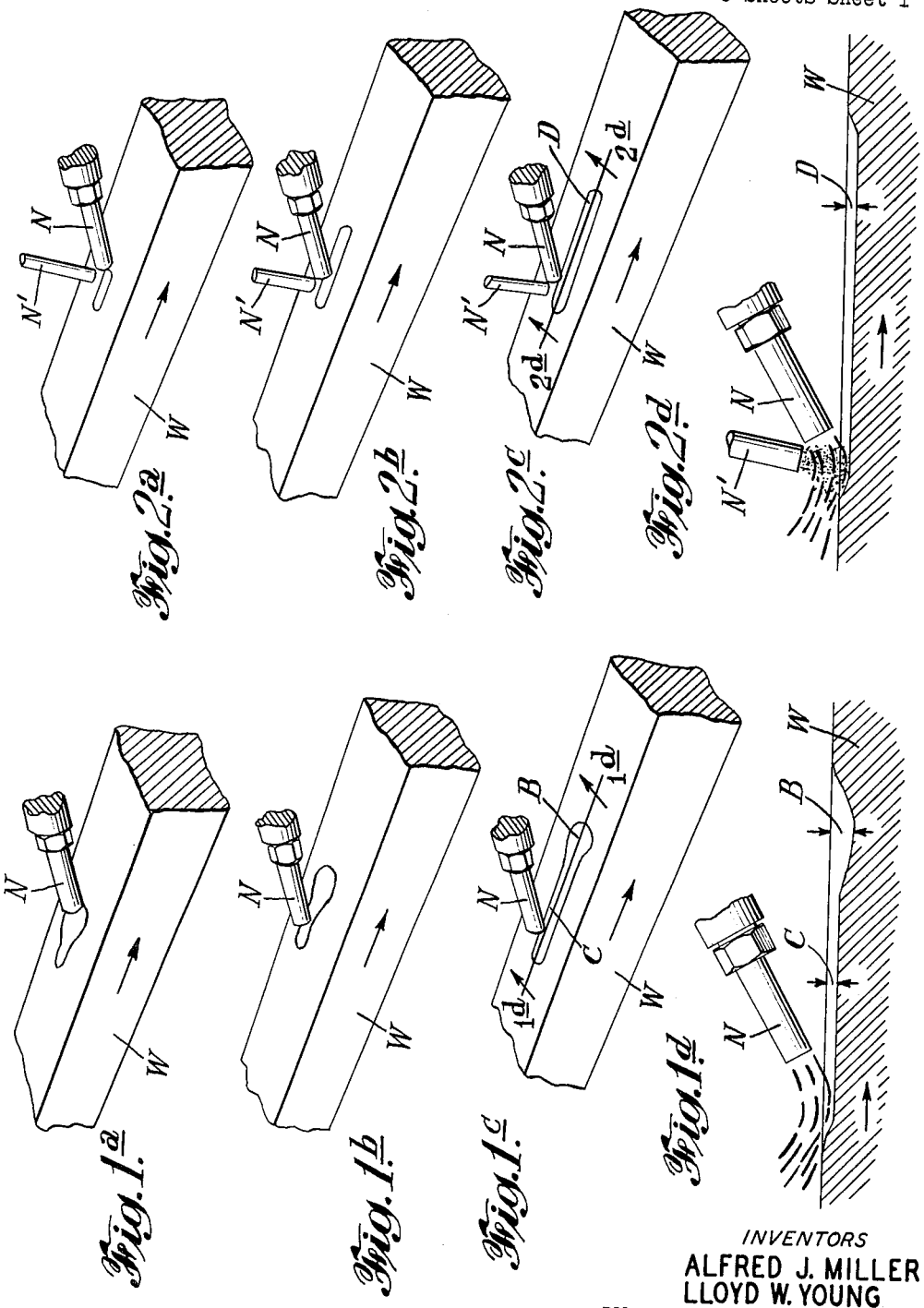

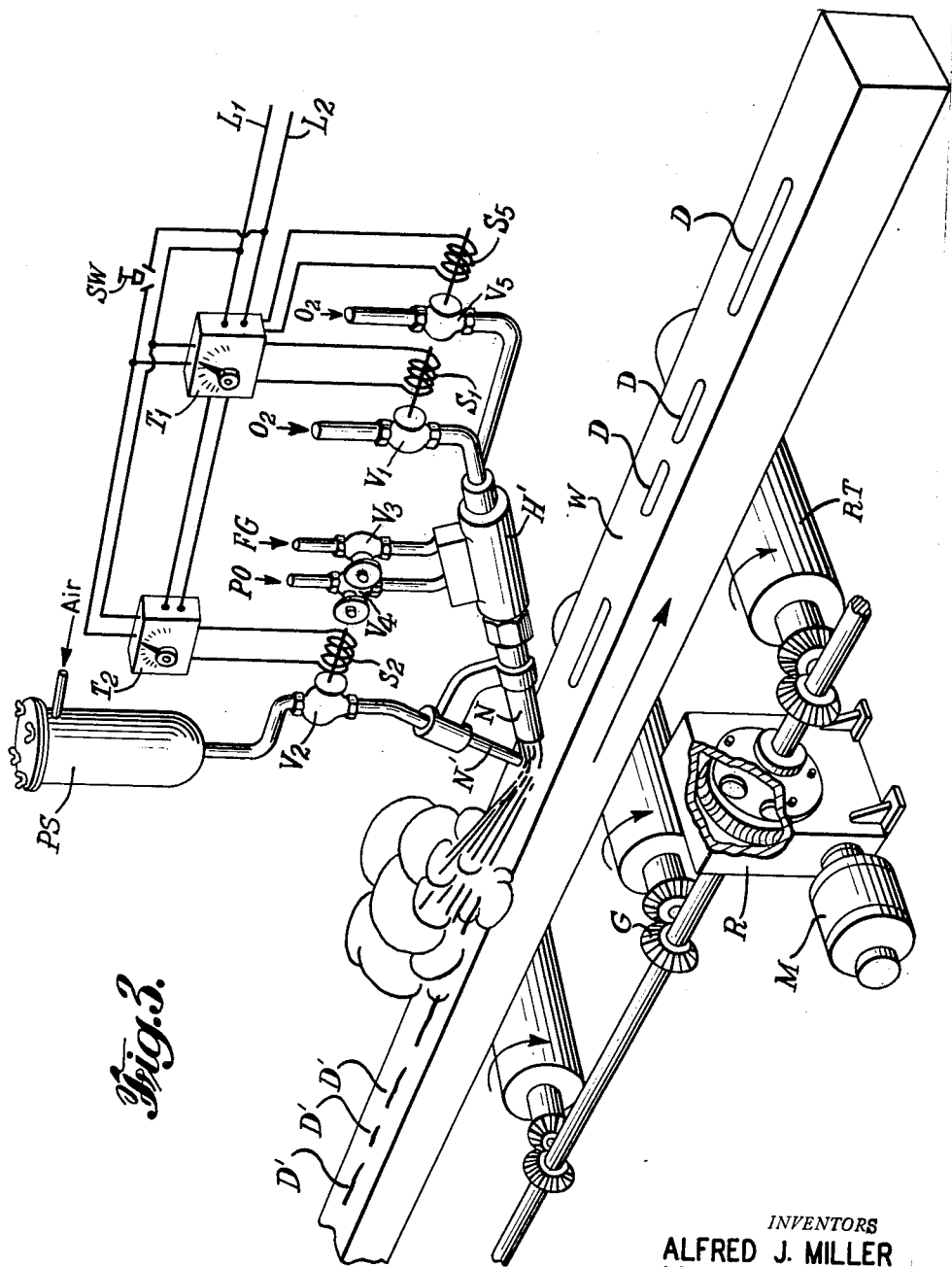

April 12, 1966 A. J. MILLER ET AL 3,245,842
SELECTIVE THERMOCHEMICAL SCARFING PROCESS AND APPARATUS
Original Filed Aug. 29, 1957 9 Sheets-Sheet 4

INVENTORS
ALFRED J. MILLER
LLOYD W. YOUNG

BY Barnwell P. King
ATTORNEY

Fig. 6.

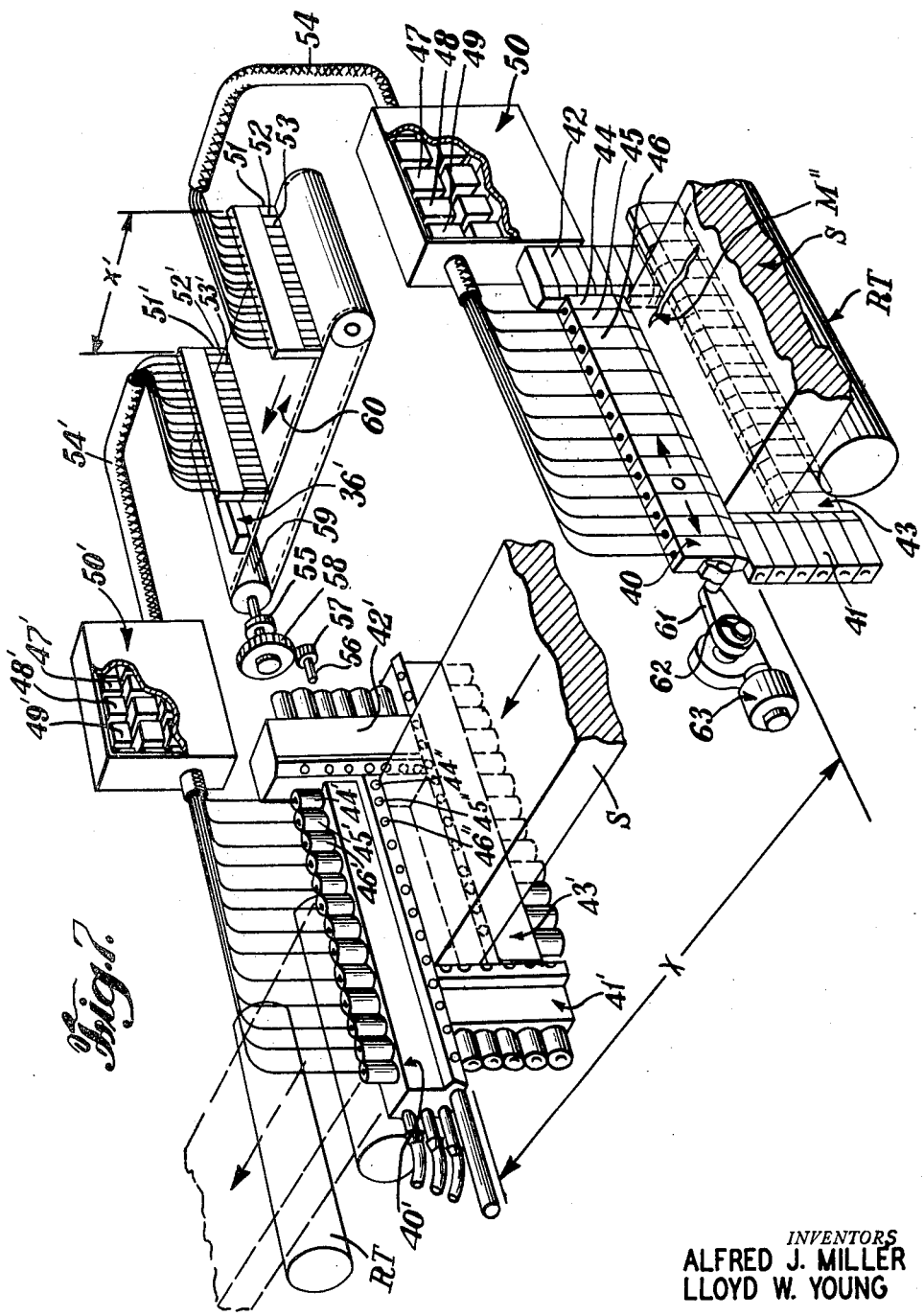

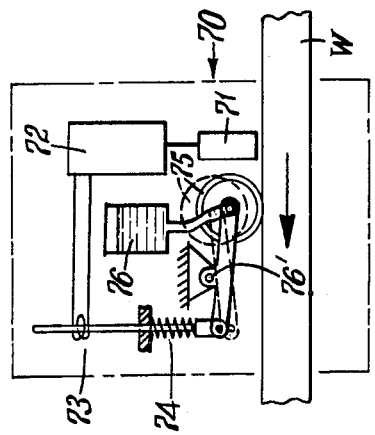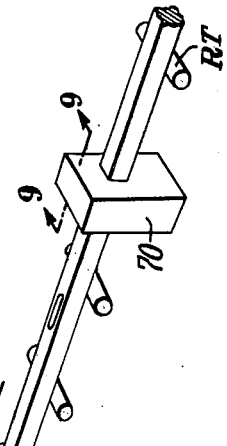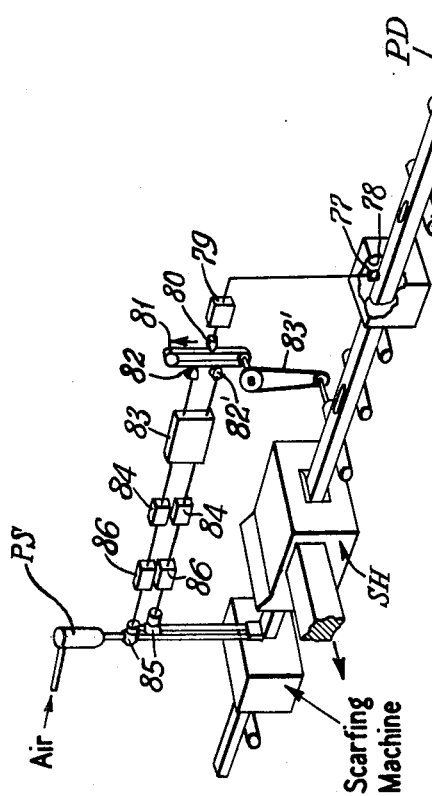

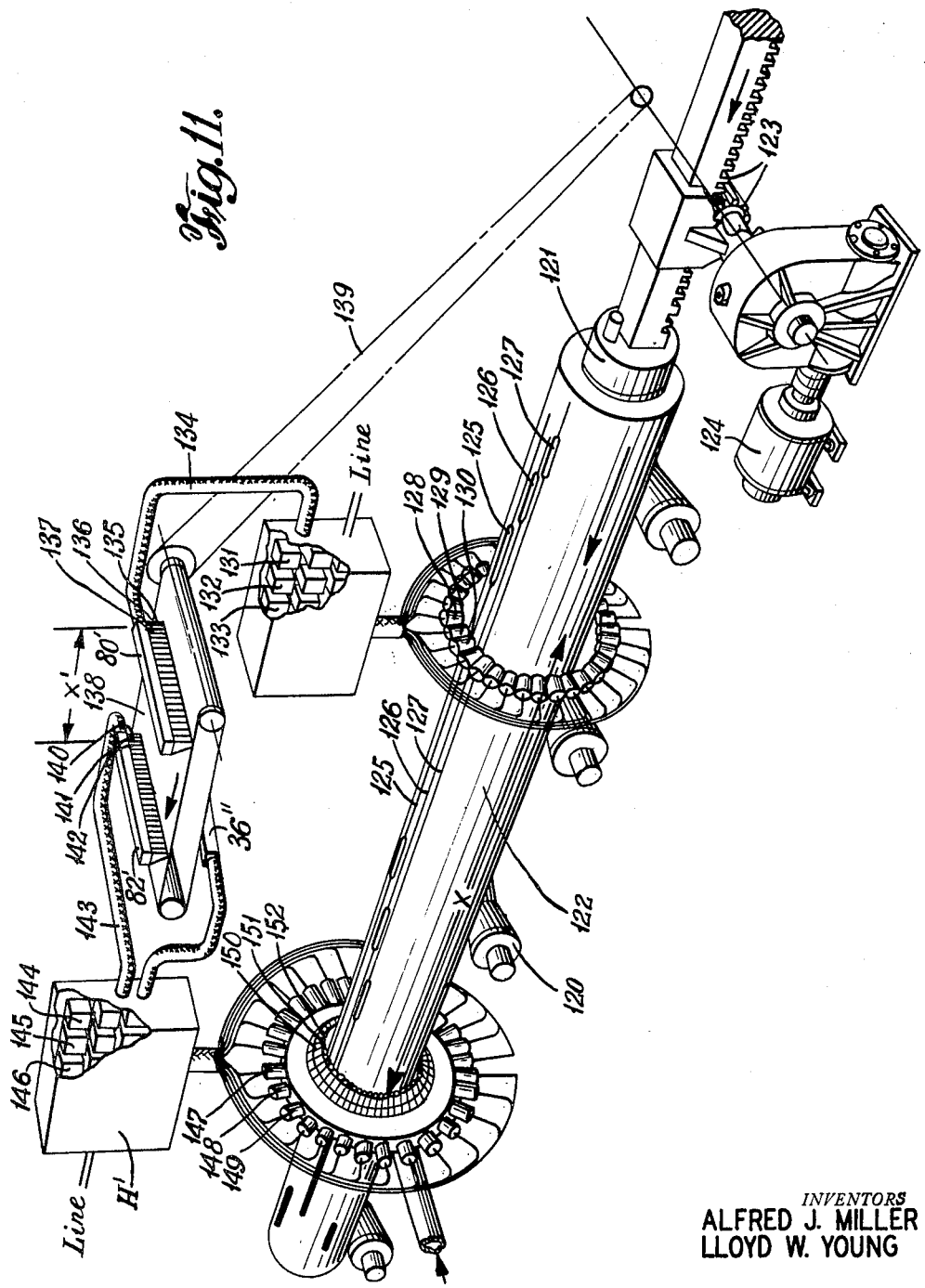

United States Patent Office 3,245,842
Patented Apr. 12, 1966

3,245,842
SELECTIVE THERMOCHEMICAL SCARFING
PROCESS AND APPARATUS
Alfred J. Miller, Westfield, N.J., and Lloyd W. Young, Miami, Fla., assignors to Union Carbide Corporation, a corporation of New York
Continuation of application Ser. No. 681,104, Aug. 29, 1957. This application Nov. 14, 1963, Ser. No. 335,450
12 Claims. (Cl. 148—9.5)

This application is a continuation of our copending application Serial No. 681,104, filed August 29, 1957, now abandoned.

This invention relates to thermochemical scarfing or desurfacing of bodies, and more particularly to selectively scarfing those areas containing surface defects as distinguished from desurfacing the entire face of each body.

The main object of the invention is to increase the yield of sound and useful metal in thermochemically surface conditioning bodies of metal, especially in the case of ferrous metal such as steel bodies that are relatively cold, while increasing the speed, reducing the overall cost thereof, by partly or entirely mechanizing the operation which has not been possible in the past in such case. This is accomplished by moving the body to be scarfed through an automatic selective thermochemical scarfing station provided with a battery of scarfing devices each of which includes independently operable means for automatically starting, continuing and stopping a flute producing thermochemical metal removal operation of controlled width on such moving body without any interruption in such continuous movement, and selectively operating such devices when surface defects are to be removed fall within the operative range thereof, so that metal is selectively removed from the body thereby in the area containing such defects. Thus, those surface areas in which there are no defects are not scarfed, and such unscarfed areas increase the yield of sound and useful metal in the body so surface conditioned in proportion to the extent thereof in relation to the entire surface that would otherwise be scarfed according to the prior art involving mechanized thermochemical desurfacing in one pass.

Briefly, according to the invention, the surface defects to be removed from such bodies are first located thereon, and the relative location of such surface defects are recorded. Then, the actual surface defects are removed from such bodies with the aid of the so recorded information, by continuously moving the recording in synchronized relation with the removal of such defects, the starting of each of such selective defect removals being accomplished without any interruption in such continuous relative movement of the body.

More specifically the invention comprises selectively removing thermochemically surface defects from metal bodies, by recording the relative location of such surface defects on an information storage device such as a tape, and continuously moving said bodies successively by a thermochemical scarfing station. Such station contains a plurality of equally spaced transversely alined scarfing nozzles adapted, when operated, to thermochemically scarf preselected longitudinal zones on such bodies, without any interruption for starting the operation. The tape is moved in synchronism with the movement of each of such bodies as it passes by said station, and selectively operates said scarfing nozzles with the so recorded information to thermochemically flying-start and remove only the surface defects along such preselected longitudinal zones from each body. The nozzles are operated only during those periods necessary to start the operations and remove the selected defects.

The problem of surface conditioning in the steel industry has long indicated the need for an automatic selective spot scarfer. When defects in steel cover a relatively small portion of the surface area, removal of the entire surface wastes good metal. Because of this, steel producers are quite reluctant to scarf the entire surface in order to remove random, minor defects. What the industry needs is a machine that will remove only that portion of the surface that contains the imperfections. Also, production could be increased if such a machine could do this automatically, using a continuous setup to reduce the necessity for handling and temporary storage. Selective spot scarfing is especially desirable on alloy grades where the steel cost is high and even a slight increase in yield is worthwhile.

The solution to this selective conditioning problem is by no means obvious. Instantaneous, true flying starts, for example, are essential. Such flying starts on cold steel have been impossible previously, constituting a major reason why selective scarfing has never been accomplished before. Important factors affecting true flying starts include steel travel speed, nozzle angle and height, gas pressures and flows, powder flows, and timing sequence.

As the usual surface defect in steel is disclosed only by careful inspection by an experienced man, to find a suitable mechanized inspection principle which could be employed to automatically detect defects, relay the defect location information, and activate the scarfing nozzles as required, represents another difficult problem.

In the drawings:

FIGS. 1a–1c are fragmentary perspective views of a steel body having an objectionable flute due to poor starting;

FIG. 1d is a vertical-longitudinal section thereof, the scarfing nozzle being shown in side elevation;

FIGS. 2a–2d are views similar to FIGS. 1a–1d of a steel body having a true flying-start flute;

FIG. 3 is a perspective view of part of a selective scarfing set-up illustrating the invention;

FIG. 6 is a perspective view of a semi-automatic selective scarfing modification;

FIGS. 7 and 8 are similar views of fully automatic modifications;

FIG. 9 is a fragmentary view in side elevation of the defect detector of FIG. 8; and FIGS. 10 and 11 are perspective views of modifications for selectively scarfing rounds.

Figure 4:
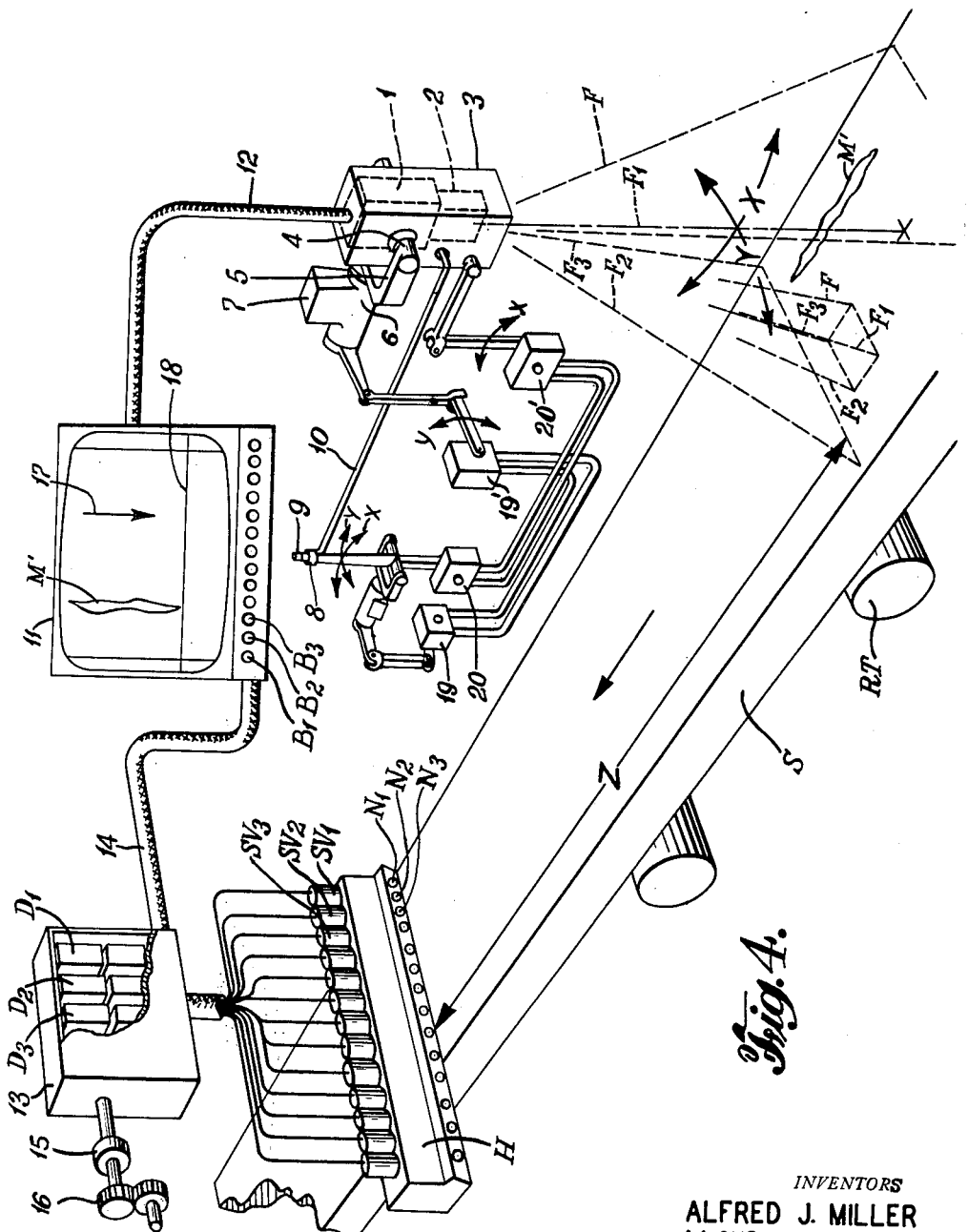
FIG. 4 is a perspective view of a modification comprising a closed-circuit television component.

A true flying start is imperative for several reasons including:

(1) Assume that in a short billet several varying-length defects occur in a staggered pattern over the horizontal surface. Also assume that flying starts are not obtainable. When the first defect reaches the nozzles, the billet will dwell under the preheat nozzles for many seconds in order to start the cut. When a second defect reaches the nozzles, the billet again will be stopped in order to preheat. However, while the second defect is being preheated, the scarfing of the first defect will remove excessive metal because of the dwell to preheat second defect.

(2) As mentioned above, in order to scarf a cold steel body, surface metal must be brought to its ignition temperature. This is done by preheating the steel for a few seconds. In prior practice, preheating delays production. As a result, the steel industry desires a machine that will spot scarf without any delays.

(3) The area that is scarfed when a defect is removed must have smooth contour, or subsequent rolling in the mill will produce new defects in the form of "laps" or laminations. As shown in FIGS. 1a–1d, when a dwell is provided to preheat work W, the start of the resulting flute is deep, and is "key-hole" shaped on the top surface and gradually decreases from depth B to depth C.

FIGS. 2a–2d illustrate a type of flute D that is obtainable with a properly-made true flying start. At the beginning the cut or flute is shallow and is tear drop or slot shaped on the top surface. Gradually the depth of the cut increases to a maximum value after an inch or two of travel. At the completion of the flute, the depth gradually decreases until it is flush with the steel surface. This type of flute eliminates subsequent laminations in rolling.

In operation, FIG. 3, a steel body W on a roll table RT passes by a thermochemical scarfing station containing a bank of individual scarfing nozzles mounted so that the body passes by them in the proper operative relationship to permit scarfing when they are operating. The roll table is driven by a motor M through a reduction gear R and gearing G. For simplicity of description, only one nozzle N is shown in the drawing. A powder supply hopper PS and powder nozzle N' are associated with each scarfing nozzle N. Powder hopper PS is a pressurized type powder dispenser; that is, the flow of powder from the hopper may be controlled by varying the quantity of gas, such as air, supplied to the hopper, thereby varying the head pressure above the powder in the hopper. When a defect D' approaches nozzle N', a circuit $L_1L_2$ is closed to timer $T_2$ by operating a switch SW, which energizes a solenoid $S_2$, thereby opening a valve $V_2$ and initiating a flow of powder which is injected into a preheat flame from nozzle N'. Fuel gas FG flow rates and preheat oxygen PO flow rates are controlled by means of valves $V_3$ and $V_4$ respectively. By adjusting valves $V_3$ and $V_4$, the desired quantity of preheat gases for the preheat flames is supplied to the header H' and then to the nozzle. At almost the same time, a circuit is closed in timer $T_1$ which energizes solenoid $S_1$ thereby opening valve $V_1$ and permitting the oxygen to be increased from a "bleeder" flow to an intermediate or starting value to set up conditions for producing a true flying start of the scarfing reaction, after which the oxygen flow is increased to a cutting value by opening valve $V_5$ which is energized by solenoid $S_5$ through timer $T_1$. For carbon steel bodies the powder flow is shut off as soon as the reaction is started, inasmuch as it is not needed to sustain the reaction. The cutting oxygen flow is kept at the amount required for scarfing a flute D the full length of the defect. At the end of the defect, the oxygen flow is gradually reduced to burn the molten metal that is flowing ahead of the scarfing pass and thus eliminate any excess metal that is removed from the flute and may be flowing on the surface.

Some oxygen is permitted to flow through the nozzles (referred to above as a "bleeder" flow), whether scarfing or not, so that oxygen passing through the adjacent "unused" nozzles in the scarfing bank burns the excess metal from the edges of any scarfing cut. This leaves a clean, slag-free surface suitable for subsequent processing of the steel.

If desirable for economy reasons, each scarfing nozzle can be valved conjunctionally with its two adjoining nozzles so that oxygen will flow only through its adjoining nozzles when any particular nozzle is turned on. Defects were removed using this flying start arrangement. However, the conditions listed below had to be adhered to in order to insure positive starts at the speeds indicated.

TABLE I

*True flying starts-travel speed—25 f.p.m.*

Scarfing nozzle _____ "Oxweld" No. 38 (std.)[1].
Scarfing Nozzle angle _____ 45 deg.
Scarfing nozzle height from work _____ ¾ to 1¼ in.
Powder nozzle _____ 3/16 in. S.S. tubing.
Powder nozzle angle _____ 85 deg.
Powder-hopper pressure _____ 0.21 kg./cm.$^2$ (3 p.s.i.).
Powder-hopper air flow _____ 4 liters/min. (8½ c.f.h.).
Powder _____ 3% Al, 97% Fe.
Powder flow _____ 5½ oz./min.
Cutting oxygen pressure _____ 25 p.s.i.
Bleeder oxygen pressure _____ 2 to 7 p.s.i.
Preheat oxygen pressure _____ 17 p.s.i.
Acetylene pressure _____ 12½ p.s.i.

[1] Manufactured by Linde Division, Union Carbide Corporation.

TABLE II

*True flying starts-travel speed—60 f.p.m.*

Scarfing nozzle "Oxweld" _____ No. 38 std.
Scarfing nozzle angle _____ 45 deg.
Scarfing nozzle height from work ____ ¾" to 1¼".
Powder nozzle _____ 3/16" S.S. tubing.
Powder nozzle angle _____ 87°.
Hopper pressure _____ 9 p.s.i.
Powder _____ 10% Al, 90% Fe.
Powder flow _____ 10 oz./min.
Starting oxygen pressure _____ 9 p.s.i.
Cutting oxygen pressure _____ 25 p.s.i.
Bleeder oxygen pressure _____ 4.5 p.s.i.
Preheat oxygen pressure _____ 17 p.s.i.
Acetylene pressure _____ 12 p.s.i.

Referring to FIG. 4, a hot slab S, for example, rests upon and is transported by a roll table RT under a thermochemical scarfing station containing a selective thermochemical scarfing head H. Since the latter, in general, is well known only those parts essential to the present selective scarfing operation will be referred to. While only one head is illustrated on the top surface of the slab, it will be understood that as many as four heads could be employed for scarfing all four sides of the slab simultaneously.

The surface defect detecting method of this modification makes use of a TV camera 1 and variable focus (zoom) lens 2 enclosed within a water cooled housing 3. The TV camera and housing unit is mounted in a gimble arrangement consisting of pintle bearings 4, clevis 5, clevis bearing 6, and mounting bracket 7. This type of mounting permits the TV camera to move in two planes, the purpose of which will be described below.

Movement of the TV camera parallel to the slab is accomplished by moving control lever 8 in a direction indicated by arrow X. Such movement activates the hydraulic servo control units 20 and 20' in the X direction. Transverse movement of the TV camera is accomplished by moving control lever in a direction indicated by arrow Y. This movement activates the servo control units 19 and 19' in the Y direction. The field observed, when the lens is set for long focal length or close-up, is indicated by dotted lines F, $F_1$, $F_2$, $F_3$. Focusing of the lens is accomplished remotely by a button 9 on control lever 8 through cable 10. The lens is motorized for remote control of the focal length and may be changed from maximum in 2 seconds. The image picked up by the TV camera is conveyed to a TV receiver 11 through cable 12.

The prime objective is the use of a closed TV circuit, as outlined herein, is to permit the scarfing operator to observe a picture of the surface of the slab in greater detail, thereby greatly facilitating the detection of surface imperfections and to allow inspection of the slabs at a comfortable and safe distance (particularly away from hot steel bodies) in the enclosed protective control pulpit.

The flow of scarfing oxygen to scarfing nozzles $N_1$, $N_2$, $N_3$, etc., is controlled by solenoid valves $SV_1$, $SV_2$, $SV_3$, etc., and these valves are turned on by time delay relays $D_1$, $D_2$, $D_3$, etc., in an enclosure 13. Push buttons $B_1$, $B_2$, $B_3$, etc., are located in a panel under the TV picture tube and connect with time delay relays $D_1$, $D_2$, $D_3$, etc., through cable 14. Time delay relays $D_1$, $D_2$, $D_3$, etc., are driven by the roll table motivating means through a remotely controlled clutch 15 and gearing 16.

When the operator spots a slab defect M', for example, on the TV screen, he depresses the button $B_3$, for example, in alignment with the defect. Since the travel speed of the roll table is synchronized with the time setting of the time delays $D_1$, $D_2$, $D_3$, etc., the solenoid $SV_3$ and the nozzle $N_3$ are not turned on until the defect M' on slab S has traveled a distance Z. It will be noted that defect M' on slab S is observed on the TV screen as M' and is directly over button $B_3$ which is in alignment, with respect to the edge of the slab, with nozzle $N_3$.

From the foregoing, it will be clear that an operator located remotely from the slab can observe and inspect the surface for imperfections, and thereupon select and depress one or more buttons directly under each defect noted on the TV screen, thereby starting the timers in operation which will result in the removal of the imperfection after the imperfection has traveled from the point of observation to the scarfing head H or distance Z.

The image of the slab on the TV screen travels from top to bottom as indicated by arrow 17. A reference line 18 on the screen, is used to indicate the precise moment when the selected buttons corresponding to the defects should be depressed.

Figure 5:
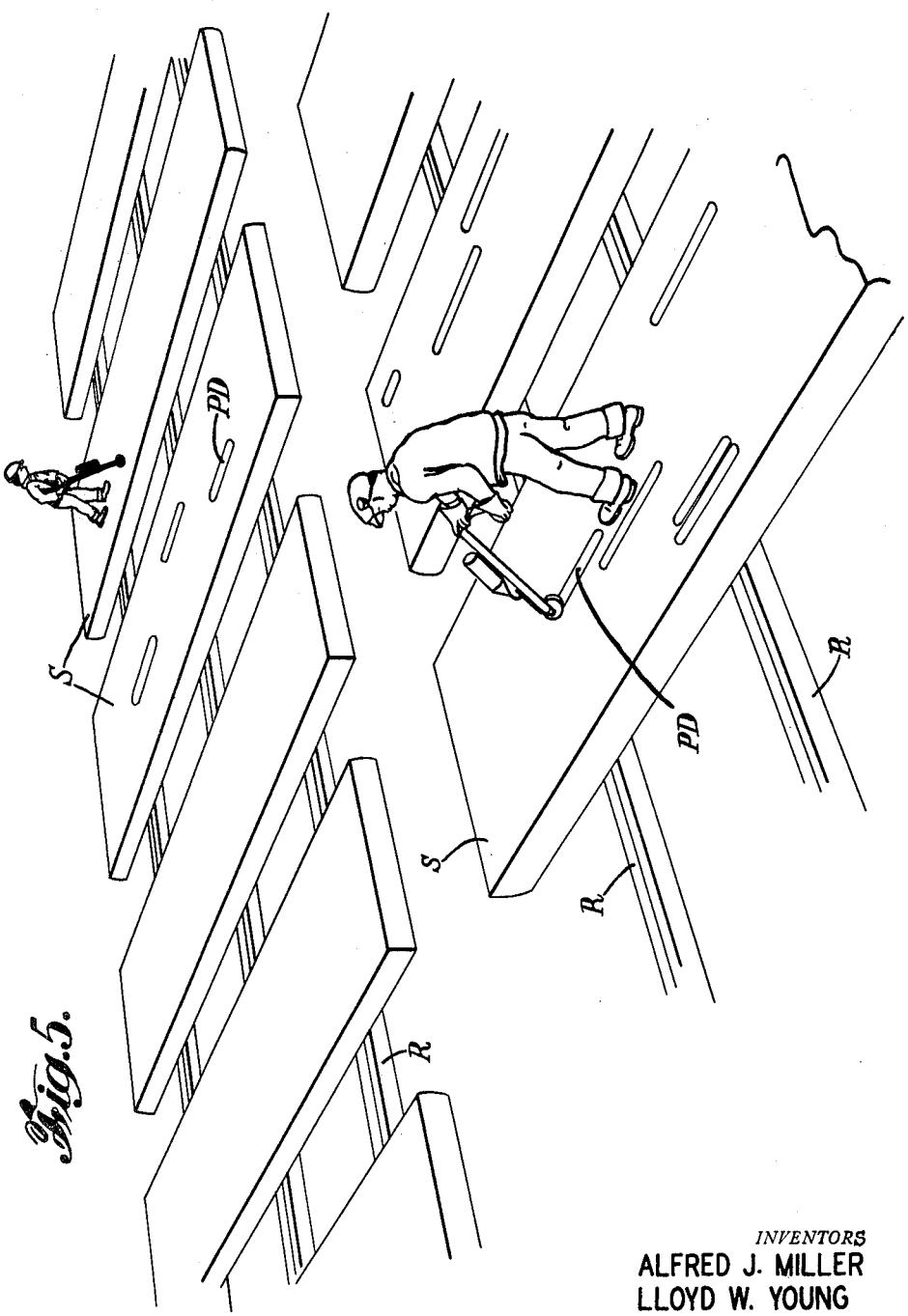
FIG. 5 is a perspective view of operators spotting surface defects in steel slabs for semi-automatic selective scarfing according to the invention.
Figure 6:
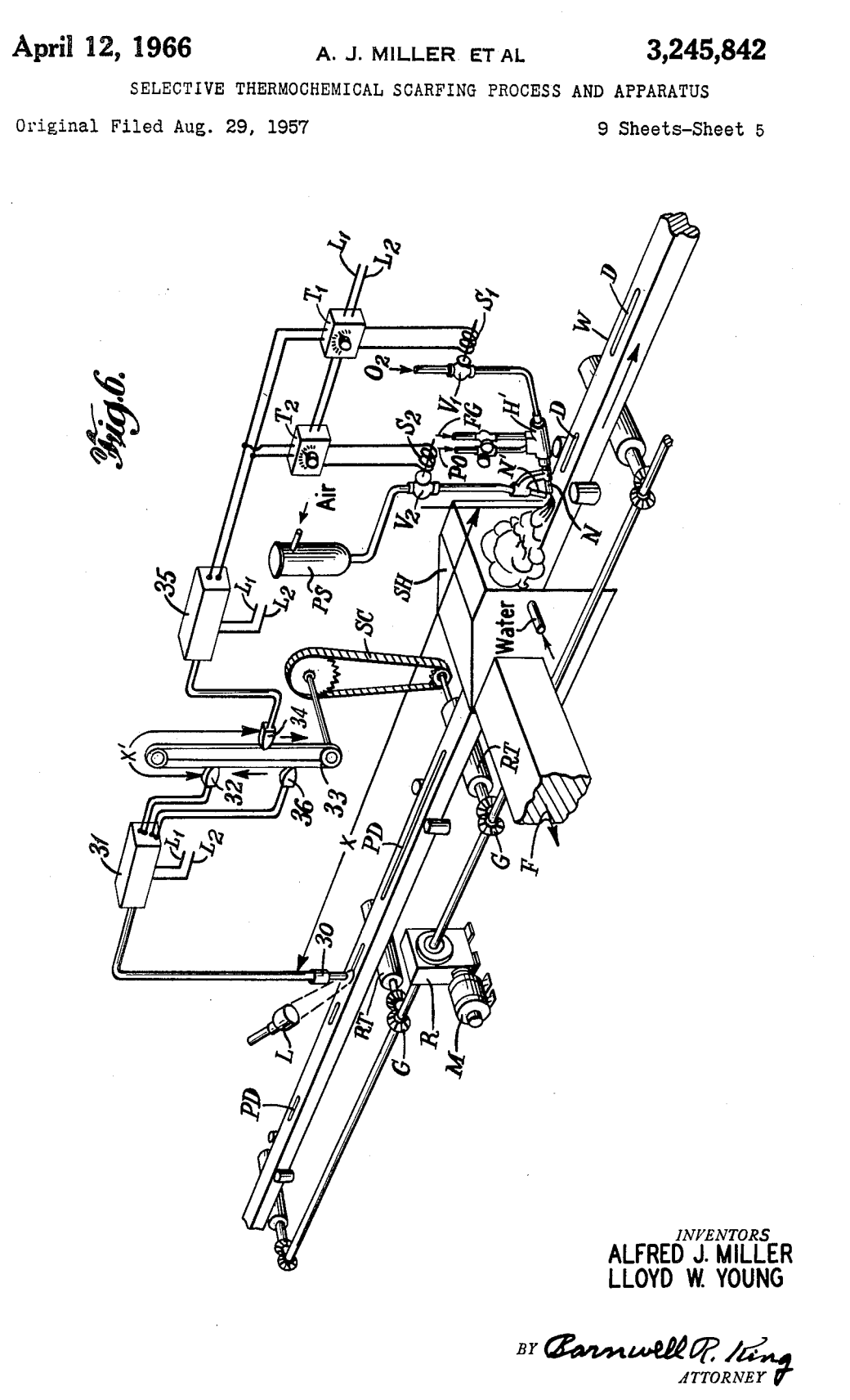

Alternately the TV receiver 11 is used to record the imperfections on a tape which is played back at a convenient time to carry out the process. As shown in FIG. 5, defects are first spotted visually by an inspector, who then marks each defect for its full length with paint PD having color contrast with the slab S, resting on rails R. Referring to FIG. 6, the marked steel W is conveyed by roll table RT which is driven by a motor M through a reducer R and gearing G under light source L and photocell 30, which picks up the reflection from painted defect area PD and produces a signal which is modulated by a tone and amplified by an amplifier 31. The output of amplifier 31 is transmitted to a recording head 32. The amplified signal at recording head 32 is imparted to a moving magnetic tape 33 in the conventional manner used in making sound recordings.

"Playback" or reproducing head 34 is mounted in alignment with the recording head 32 so that the signal imparted to the recording tape 33 by recording head 32 is picked up by the reproducing head 34 when the magnetic tape has traveled a distance X' from the recording head 32 to the reproducing head 34.

The output of reproducing head 34 is transmitted to an amplifier 35 which includes suitable relays to magnify the small signal received to one which can operate a higher current solenoid valve. The output circuit of amplifier 35 connects with solenoid valves $S_2$ and $S_1$ through time delay relays $T_2$ and $T_1$. Solenoid $S_2$ actuates a powder valve $V_2$ which allows powder from pressurized hopper PS to flow to powder nozzle N'. Preheat oxygen PO and fuel gas FG for the preheat flames are supplied to the header H' in the same manner as described above. Solenoid $S_1$ actuates an oxygen valve $V_1$ which permits oxygen to flow to the scarfing nozzle N. The time delays are preset to actuate the solenoids $S_1$ and $S_2$ at a point a short distance ahead of the actual defect. This provides time for a true flying start to "take hold," or ignite the steel. Solenoids $S_1$ and $S_2$ are activated for the full length of the signal, which corresponds to the length of the defect to be scarfed.

An erase coil 36 is positioned after the reproducing head 32 for removing the stored information (signals) from the magnetic tape 33. This arrangement utilizes an endless or continuous magnetic tape, and therefore permits scarfing of defects of any length.

An appreciable distance X is required between the scarfing nozzle N and the photocell 30 because of the heat and sparks produced by the scarfing reaction. As an added precaution a smoke hood SH is positioned adjacent the scarfing nozzle at a point intermediate such nozzle N and the photocell 30. Smoke generated by the scarfing reaction is carried from the smoke hood SH through duct F. A pressurized water stream is supplied to the smoke hood SH to wash any slag from the slab being spot scarfed. The distance X' between the recording head and reproducing or playback head is purposely made shorter than distance X for sake of compactness, permitting shorter lengths of magnetic tape 33. For example, if the distance X' is made one-half the distance X the travel speed of the magnetic tape would be one-half the travel speed of the steel. It is conceivable that the distance X could be made equal to X', in which case the actual travel speed of the tape would be equal to the speed of the slab.

In addition to visually detecting and painting defects, there are several commercially available defect detecting methods. Among these are included the "Zyglo," "Magnaflux" and "Magnaglo" methods. Other means of automatically detecting defects can also be used without departing from our invention.

The Zyglo process required several steps. First the steel must be cleaned and Zyglo Penetrant applied to the entire surface of area to be tested by dipping, hose, spray, or brush. Enough time must be allowed for the penetrant to be drawn into all the defects by capillary action. Then chronologically the specimen must be rinsed, developed, and dried. Under an ultraviolet light the applied Zyglo Penetrant will glow and reveal all of the defects. This Zyglo process could be employed in place of the reflective paint described above to actuate a photocell.

Magnaflux and Magnaglo methods employ magnetic particles. Also, both methods require the setting up of a magnetic field within the part to be inspected. Sudden interruptions in this magnetic field caused by defects crowd some of the magnetic flux outside the surface of the part. These fields act as local magnets and attract and hold finely divided particles applied to the surface of the body. The application of Magnaglo is the same as Magnaflux but uses fluorescent magnetic particles that glow under black light.

FIG. 7 illustrates a set up which both detects and scarfs out defects in a fully automatic operation. Four scarfing heads 40', 41', 42', and 43' are shown, one for each longitudinal face of the steel body S. Since they are similar in construction, only the top head 40' will be described.

The sensing or defect detecting elements, consisting of four units 40, 41, 42, and 43 are positioned at a fixed distance X from the scarfing heads. Only detector unit 40 will be discussed. There is one sensing element for each scarfing nozzle and each individual sensing element is laterally aligned precisely with each individual scarfing nozzle. The sensing elements contain electro-magnetic coils, which are oscillated or reciprocated across the steel, as at O. The stroke of oscillation is equivalent to the spacing between nozzles. As the magnetic flux path (or magnetic lines of force) reciprocates over the steel, the presence of a crack or seam disturbs the normal lines of magnetic force resulting in a change in current through the coils, which imparts a signal to the corresponding amplifier.

In operation, the slab S travels down the roll table RT at a speed which is suitable for the scarfing operation. When the front end of the slab S passes under the reciprocating sensing elements 44, 45, 46, etc., its presence influences the magnetic properties of the sensing elements and produces a "normal" signal which is amplified by the individual amplifiers 47, 48, and 49, etc., in enclosure 50. Output from each individual amplifier is transmitted to corresponding recording heads 51, 52 and 53, etc., through a multi-conductor cable 54. The signal produced by the presence of the slab under the sensing element is utilized to engage a magnetic clutch 55. The purpose of the magnetic clutch is to prevent the magnetic tape from rotating with the roll table when there is no steel on the table. (By use of a conventional time-delay relay, the tape can be kept rotating at the end of each operation until the tail end of the steel travels the distance from the detectors to the nozzles, or distance X.)

The input shaft 56 of reduction gears 57 and 58 are connected to the roll table RT. Thus, when the clutch 55 is engaged, the amount of rotation of roll 59 and the movement of the magnetic recording tape 60 will be positively synchronized with the actual movement of the slab traveling along the roll table. Obviously, by suitable gearing, the actual speed of the tape and the distance it moves can be made less than that of the steel bodies.

In order for the sensing element to produce a signal indicating a defect, the sensing elements are oscillated transversely with respect to the slab, as mentioned above. Oscillation O of the sensing elements is accomplished by providing a link 61, cam 62, and motor and reduction unit 63. When a surface defect, such as that illustrated at M", passes under sensing element 46 the surface defect alters the magnetic characteristic of the sensing element, thereby producing a signal different from the "normal" signal registered by solid steel body. The defect signal is amplified by amplifier 49, the output of which is transmitted to corresponding recording head 53. The amplified signal at recording head 53 is imparted to its corresponding specific path on the magnetic tape 60. This "path" on the tape is equal or proportional to the width of its recording head. The remainder of the operation is similar to that described above in the case of semi-automatic selective scarfing.

That is, reproducing or play-back heads 51', 52', 53', etc., are in alignment with the recording heads 51, 52, 53, etc., so that the signal imparted to the recording tape 60 by the recording head 53 will be picked up by the reproducing head 53' when the magnetic tape has traveled from the recording heads to the reproducing heads. The output of the reproducing heads 51', 52', 53', etc., is connected to the individual amplifiers 47', 48', 49' in enclosure 50' through a multi-conductor cable 54'. The output of amplifiers 47', 48', 49' connect with solenoid valves 44', 45', 46' and these valves individually control the flow of oxygen to the scarfing nozzles 44'', 45'', 46''. An erase coil 36' is positioned adjacent to the reproducing heads 51', 52', 53' for removing the stored information (signals) from the magnetic tape. This arrangement makes use of an endless, continuous magnetic tape of relatively small size and permits scarfing slabs of indefinite lengths.

FIG. 8 illustrates another modification for automatically detecting defects and selectively removing the same without any interruption in the continuous movement of the body being treated. In operation, the body W to be treated is conveyed by roll table RT through an automatic painting device 70. FIG. 9 illustrates an enlarged detailed view taken on section 9—9 of the painting device 70. A defect detecting means 71 (magnetic, ultrasonic or the like) picks up a defect and sends the signal to an amplifier 72. The output of amplifier 72 actuates a solenoid 73 which compresses a spring 74. Fountain-type wheel 75 thereupon pivots about fulcrum 76' and paints the billet W at the corresponding defect. Paint is supplied from a hopper 76 to the wheel 75 through a flexible hose and swing joint (not shown in the drawing).

After the body W leaves the paint device 70, such body is conveyed under a photocell 77, and a light source 78 which supplied the necessary illumination for the photocell operation. The photocell 77 picks up a signal from the painted defect PD and sends it through amplifier 79. The output of amplifier 79 is transmitted to a record head 80. The amplified signal at record head 80 is imparted to a tape 81.

Playback head 82 picks up the signal when the magnetic tape 81 has traveled from the record head 80 to the playback head 82. Erase head 82' removes the signal from the tape 81 after it passes play-back head 82. The magnetic tape drive is geared to the roll table RT through drive 83'. In this manner defects recorded on the tape 81 move in synchronization with the actual defect on the billet. The output of playback head 82 is transmitted to amplifier 83, the output circuit of which is connected to a relay 84. The function of the relay 84 is to take the low current signal coming from the amplifier 83 and magnify it to operate relatively high current solenoid valves 85 through timers 86. The solenoid valves 85 turn on the powder from hopper PS and the oxygen. As was the case above, a smoke hood SH is provided for confining the scarfing reaction. The remainder of the operation is similar to that described above.

Figure 10:
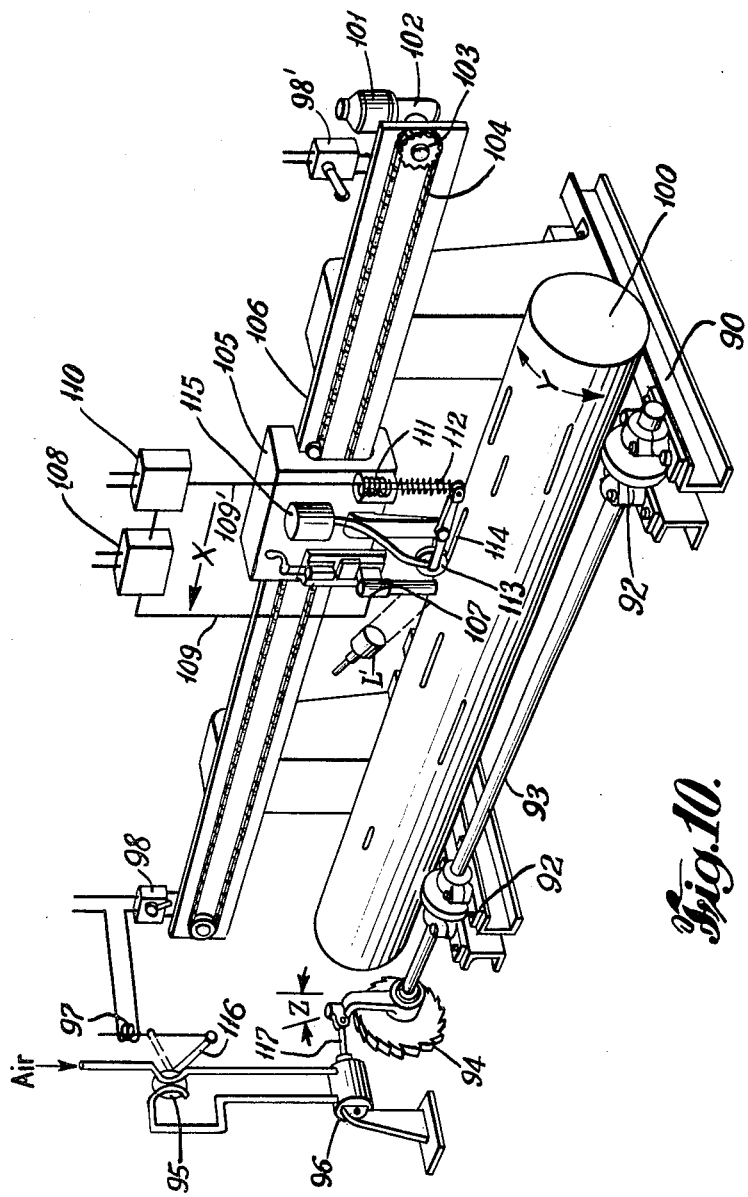

Basic flying starts and automatic defect detection according to the invention have been applied to the selective scarfing of rounds as shown in FIGS. 10 and 11. FIG. 10 shows apparatus for detecting and painting defects, while FIG. 11 depicts the equipment employed for the selective scarfing operation. Before the set up is utilized, the round is treated by the Zyglo process (or any other process which illuminates defects). That is, Zyglo Penetrant is applied to the round to illuminate the defects, so that a photocell can pick up a signal. If the photocell were replaced by a defect detector (magnetic or some similar means) the necessity of employing the Zyglo process and painting to detect defects can be eliminated. However, the use of Zyglo and paint is a variation of the methods described above.

Referring to FIG. 10, a cold piece of round stock treated with Zyglo Penetrant is positioned on the frame 90 in contact with the wheels 92. Said wheels 92 are joined by a shaft 93. At the extremity of shaft 93 is a ratchet 94. Ratchet 94 is mechanically operated by a four-way valve 95 and a cylinder 96 which are operated electrically by a solenoid 97 and a limit switch 98.

To start the selective scarfing operation, carriage 105 is positioned over the end of the round 100. Motor 101 and reducer 102 drive the sprocket 103 and chain 104 which drives carriage 105 in the direction X down a track 106. As the carriage 105 moves along the track 106, a photocell 107 is actuated by the defects that have been illuminated by the Zyglo Penetrant and an ultraviolet light L'. A signal is then passed to amplifier 108 via conductor 109. The output of amplifier 108 is transmitted to relay 110 which operates solenoid 111. Solenoid 111 compresses spring 112 and lowers a fountain-type wheel 113 to paint the corresponding defect 114. Paint hopper 115, containing a highly reflective paint, is connected to the paint wheel 113 by a flexible hose and swing joint.

When the carriage 105 reaches the opposite end of the track 106, it throws limit switch 98, which operates solenoid 97, thereby actuating the four-way valve 95 by pulling a lever 116 up into the dotted position shown in the drawing. Air passes down to the cylinder 96, forcing piston 117 out and rotating the ratchet 94 one station, so that round 100 is rotated the arc distance Z, the normal width scarfed by one nozzle. As the billet is being so indexed in the direction Y, the carriage 105 moves back in the direction X to its starting position at the other end of the track.

The so painted round 122 then is placed on idler rollers 120, FIG. 11. Electro-magnet 121 holds the round 122 in position and prevents any rotation thereof. Gear and rack 123, driven by a motor 124, move the round 122 over the idler rolls 120 at a predetermined scarfing speed. When previously marked defects 125, 126, and 127 pass under the photocells 128, 129, and 130, the areas covered by reflective paint actuate the photocells which send signals to the corresponding amplifiers 131, 132 and 133.

An amplified signal is passed through multi-conductor 134 to record heads 135, 136, and 137 in bank 80' which imparts the signals to a tape 138. The distance X', the so recorded signal travels on the tape, and the distance X which the actual defect travels, are synchronized by a drive 139, so that when the recorded signal reaches the playback heads 140, 141, and 142 in bank 82', the actual defect is approximately in the proper position to be scarfed. When the playback heads 140, 141, and 142 pick up the signals from the take 138, such signals are passed through conductor 143 to amplifiers 144, 145, and 146. The output of amplifiers 144, 145, and 146 are transmitted to solenoids 147, 148 and 149 which turn on the nozzles 150, 151, and 152 and a true flying start made in each case. A bank of erase heads 36'' removes the stored information (signals) from the magnetic tape after it passes the bank of play-back heads 82'.

The flying start is made a little ahead of the defect and exactly in line with it. When the defect reaches the nozzle, the scarfing operation is started and continuous until the entire defect is scarfed out. Time delays (not shown) are provided in housing H' to delay the shutting off of the scarfing oxygen so that the scarfed area and the resulting flute is somewhat longer than the actual defect. This permits the depth of the flute to gradually diminish until it becomes flush with the billet surface.

What is claimed is:

1. Process for selectively removing surface defects from a moving metal body which comprises locating such defects on the body; generating a signal from each located defect and transmitting such signal to a recording member to record the relative location of each defect thereon; and transmitting a signal from said recording member in synchronized response to the movement of the metal body to energize selective scarfing devices located in a bank transversely across the path of movement of such body at a scarfing station.

2. Process for selectively removing located surface defects from a moving metal body which comprises moving such body past a recording station and then on through a scarfing station provided with a battery of independently operable scarfing devices spaced transversely of the path of movement of such body; generating an electrical signal at said recording station from each located defect and transmitting such signal to a recording member to record the relative transverse and longitudinal location thereon of each located defect on the body; and transmitting an electrical signal from said recording member to energize selective scarfing devices in alignment with each located defect in synchronism with the movement of the body, to selectively remove such surface defects.

3. Process of selectively removing surface defects from bodies which comprises recording the relative location and length of each surface defect on a memory member; moving the body at scarfing speed through a scarfing station provided with a battery of independently operable scarfing devices spaced transversely of the path of movement of such body; moving the memory member in synchronism with the movement of such body past an automatic transmitting device which is operatively responsive to the recorded defects on said memory member, and automatically starting and stopping selected scarfing devices longitudinally in line with such defects on the body in response to said transmitting means, as said memory member moves past said transmitting device.

4. Method of spot scarfing located defects from metal bodies which comprises moving the body to be scarfed through a defect recording station and a scarfing station at scarfing speed, said scarfing station being provided with a battery of independently operable scarfing devices disposed transversely of the path of movement of the metal body; recording the relative location of surface defects at said recording station on an information storage device; storing the so recorded information for the dwell period required for the metal body to move from said recording station to said scarfing station, and transmitting the stored information from said information storage device to said scarfing station, so as to thereby energize selective scarfing devices in substantial alignment with each defect.

5. Process for selectively removing located defects from a moving metal body which comprises moving such body past a recording station and then on through a scarfing station provided with a battery of independently operable scarfing devices spaced across the path of movement of such body; generating a signal from each located defect and transmitting such signal to an information storage device to record the relative location of each defect thereon; storing such signal for the dwell period required for the body to move from the recording station to the scarfing station at scarfing speed, and thereafter transmitting a signal from the information storage device to energize selective scarfing devices located in substantial alignment with each defect.

6. Process as claimed in claim 5 wherein the signal transmitted to the selective scarfing devices has a duration relatively corresponding to the length of each defect so as to de-energize each scarfing device after it has scarfed out the defect.

7. Process of selectively thermochemically removing surface imperfections from metal bodies, which comprises locating such imperfections, recording the relative location of such imperfections on a continuous tape, continuously moving such bodies in succession along a selected path adjacent a station provided with a battery of thermochemical scarfing devices each of which is provided with means for accomplishing flying starts, selectively operating such devices with the so recorded information by continuously moving said tape in synchronized relation with the movement of each body as it moves by said station, and thereby selectively removing such surface imperfections with said thermochemical scarfing devices without any interruption in the movement of such body for starting each thermochemical operation.

8. Process of selectively thermochemically removing surface defects from metal bodies, which comprises recording the relative location of such surface defects on a tape, continuously moving said bodies successively by a thermochemical scarfing station provided with a plurality of equally spaced transversely alined scarfing nozzles adapted when operated to thermochemically scarf preselected longitudinal zones on such bodies, without any interruption for starting the operating, moving said tape in synchronism with the movement of each of such bodies, selectively operating said scarfing nozzles with the so-recorded information to thermochemically "flying" start and remove only the surface defects along such preselected longitudinal zones from each moving body, said nozzles being operated only during those periods necessary to start the operation and remove the selected defects.

9. Method of spot scarfing metal bodies, which comprises passing such bodies along a path through a detector station provided with a sensing device responsive to the transverse location of a defect on said body, and on through a scarfing station provided with a transverse row of scarfing devices selectively operable for accomplishing flying starts, conveying the response from said sensing device to a remote control station provided with an indicator for such transverse location of the defect, and selecting and actuating the scarfing device in register with the indicated transverse location of the defect, whereby metal is selectively removed from the body by such device in the area containing such defect.

10. Method of spot scarfing metal bodies, which comprises passing said bodies along a path through a detector station provided with a television camera, and on through a scarfing station provided with a battery of scarfing devices selectively operable for accomplishing flying starts, conveying the image from said camera to a television receiver at a remote control station provided with a battery of tune delays respectively controlling said scarfing devices, viewing said image to determine the location of a defect on the body, and selecting and actuating the time delay for the scarfing device in register with the location of such defect, whereby after the defect has traveled from said camera to said scarfing device, metal is selectively removed from the body by such device in the area containing such defect.

11. Apparatus for selectively removing surface defects from bodies, which comprises the combination of means for making an information storage recording of the location of such defects transversely of said body, means for moving the bodies along a selected path at scarfing speed, a station provided with a battery of scarfing devices disposed transversely to the path of said body and each of which includes independently operable means for scarfing a different fraction of the width of said body, and control means actuated by said recording for selectively operating said scarfing devices when the surface defects to be removed fall within the corresponding fraction of the width of said body, said control means timing the selected operation thereof until the length of the corresponding surface defect has passed the selected scarfing device at scarfing speed.

12. Apparatus for selectively removing located surface defects from metal bodies which comprises in combination, conveyor means for moving a metal body along a selected path; a battery of scarfing torches positioned at spaced intervals across said path of movement, each of said torches being independently operable for scarfing out a selected portion of the surface width of the metal body; generating means located upstream of said scarfing torches for creating an electrical signal from each located defect; an information storage device for storing electrical signals received from said generating means; electrical circuitry interconnecting said generating means with said information storage device, and electrical circuitry interconnecting said information storage device with each of said scarfing torches for selectively energizing scarfing torches in substantial alignment with surface defects on the metal body when such defects come within the operable range of said scarfing torches.

References Cited by the Examiner

UNITED STATES PATENTS

| | | | |
|---|---|---|---|
| 2,186,096 | 1/1940 | Buchnam | 266—23 |
| 2,424,270 | 7/1947 | Ehemann et al. | 266—23 |
| 2,930,228 | 3/1960 | Lawrence et al. | 266—5 X |

OTHER REFERENCES

G. H. Wilson: "Television in Industry," Elec. Eng., volume 72, pages 126–130, 1953.

"Inspection: Industrial T.V. Checks Blade Edge," Iron Age, volume 176, page 120, Nov. 3, 1955.

L. M. Exley: "Television in Power Stations for Direct Viewing of Furnace Conditions," Mech. Eng., volume 73, pages 1008–1009, 1951.

DAVID L. RECK, *Primary Examiner.*